REGENERATIVE REPEATER

Filed Oct. 23, 1956 2 Sheets-Sheet 1

INVENTOR,
FRANKLIN C. COOKINGHAM.
BY
Harry M. Saragovitz
ATTORNEY.

April 5, 1960 F. C. COOKINGHAM 2,931,860

REGENERATIVE REPEATER

Filed Oct. 23, 1956 2 Sheets-Sheet 2

INVENTOR,
FRANKLIN C. COOKINGHAM.
BY
Harry M. Saragovitz
ATTORNEY.

2,931,860
Patented Apr. 5, 1960

2,931,860

REGENERATIVE REPEATER

Franklin C. Cookingham, Cleveland, Ohio

Application October 23, 1956, Serial No. 617,892

5 Claims. (Cl. 178—70)

(Granted under Title 35, U.S. Code (1952), sec. 266)

The invention described herein may be manufactured and used by or for the Government for governmental purposes without the payment of any royalty thereon.

This invention relates to an improvement in regenerative repeater systems, and more particularly to a repeater for the regeneration of time division signals for relay operation.

Due to the nature of the multiplex telegraph signal, the problem of providing associate equipment to pass all of the signal wave form components and at the same time minimize the effects of random noise, line noise, etc., is of considerable importance. The multiplex printing-telegraph signal is made up of rectangular pulses, with square wave components of 6 cycles per second (c.p.s.), 12 c.p.s., 24 c.p.s., and 75 c.p.s. (approximations) present in the basic idle four channel 240 word-per-minute signal. The signal is asymmetrical, which means that the effective direct-current center of the signal is not located midway between the extremes of the amplitude changes in the signal. In the keying state, square wave components of 3 c.p.s. may be followed by 75 c.p.s. components, and the effective zero-center of the signal can change radically while the actual peak-to-peak value of the signal is not changed. This last-mentioned factor can seriously hamper the true reproduction of the signal due to its effect upon the automatic gain control systems usually employed in the associated equipments. As a result it is not unusual to find that equipment designed to pass the multiplex signal will, under adverse conditions, distort the wave form of a perfect multiplex signal fed into it.

In light of the above considerations, there is a definite limit to the number of times that a multiplex signal can be handled without the accumulated distortions of the associated equipments becoming excessive. Thus, unless some means is provided to restore the signal to its original form, serious errors in the transmitted intelligence occur.

The general object of this invention is to provide a regenerative repeater which substantially reduces the time distortion of individual signal changes and furnishes adequate regeneration for the retransmission of signals without loss of intelligence.

A more specific object of this invention is to provide a repeater for the regeneration of time division signals for relay operation.

These and other objects of the invention will appear in the following description, references being had to the drawings, in which.

Figure 1:
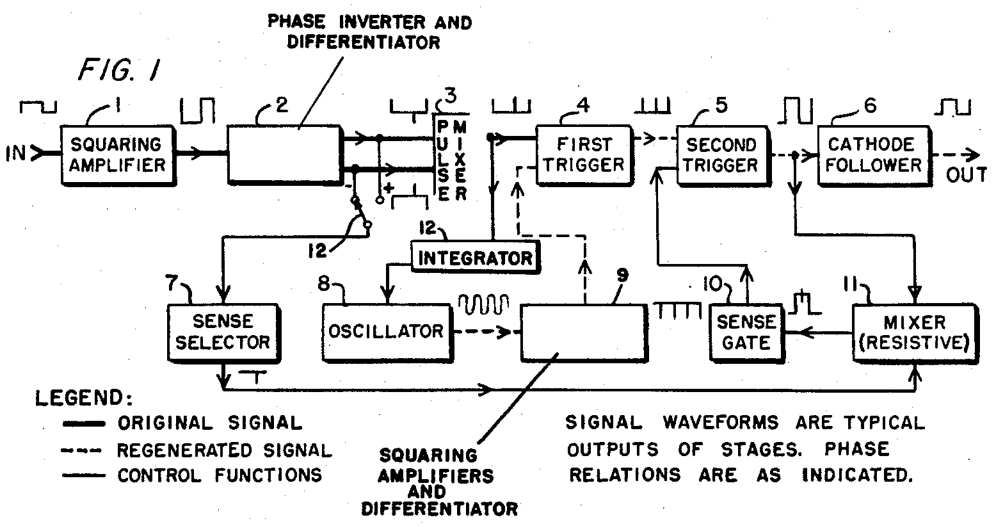
Figure 1 is a block schematic diagram of a repeater according to the invention.

Referring now to the drawings and particularly to the block diagram of Fig. 1, the incoming signal is first passed through a squaring amplifier 1 to assure rapid transition times on signal changes. The squared signal is then passed through a phase inverter 2 to obtain two equal signals of opposite polarity. These signals are differentiated and passed through the pulse mixer 3 in such a manner that one positive pulse is obtained for each and every change in the incoming signal. A local oscillator 8 designed for a high degree of frequency stability is phase-controlled by these pulses. The output wave from the oscillator is squared or top limited by amplifier 9, differentiated, and clipped in such a manner as to establish a series of negative pulses.

Both sets of pulses are now used to operate an Eccles-Jordan trigger stage 4, the positive pulses (the incoming signal) turning the stage on, and the locally generated pulses turning the stage off. The output from the trigger stage is differentiated and clipped so as to leave a positive pulse for each time that the locally generated pulses turn the stage on, one locally generated pulse is substituted for each change in the incoming signal. (It should be mentioned that the control of the local oscillator is such that it established an average phase control rather than tight coupling.)

The positive pulse obtained from the first trigger stage 4 triggers the second trigger stage 5. Stage 5 differs from the first trigger stage 4 in that the grids have a common return point, and that the circuit responds once for each positive pulse imposed upon it; negative pulses have little effect. Each pulse which arrives causes stage 5 to assume the opposite state of equilibrium to that which existed prior to the arrival of the pulse. This stage is in effect a D.C. restorer which feeds the cathode follower output stage 6.

The sensing circuit 7 compares a portion of the output signal with the incoming signal to assure that the proper phase relationships are established and maintained regardless of line disturbances, hits, or momentary loss of signal. The input pulses and output signal are mixed in a resistive network 11, and should the phase relationship become disturbed, the algebraic sum of the two signals causes an additional pulse to trip the output trigger stage, by sense gate 10.

Figure 2:
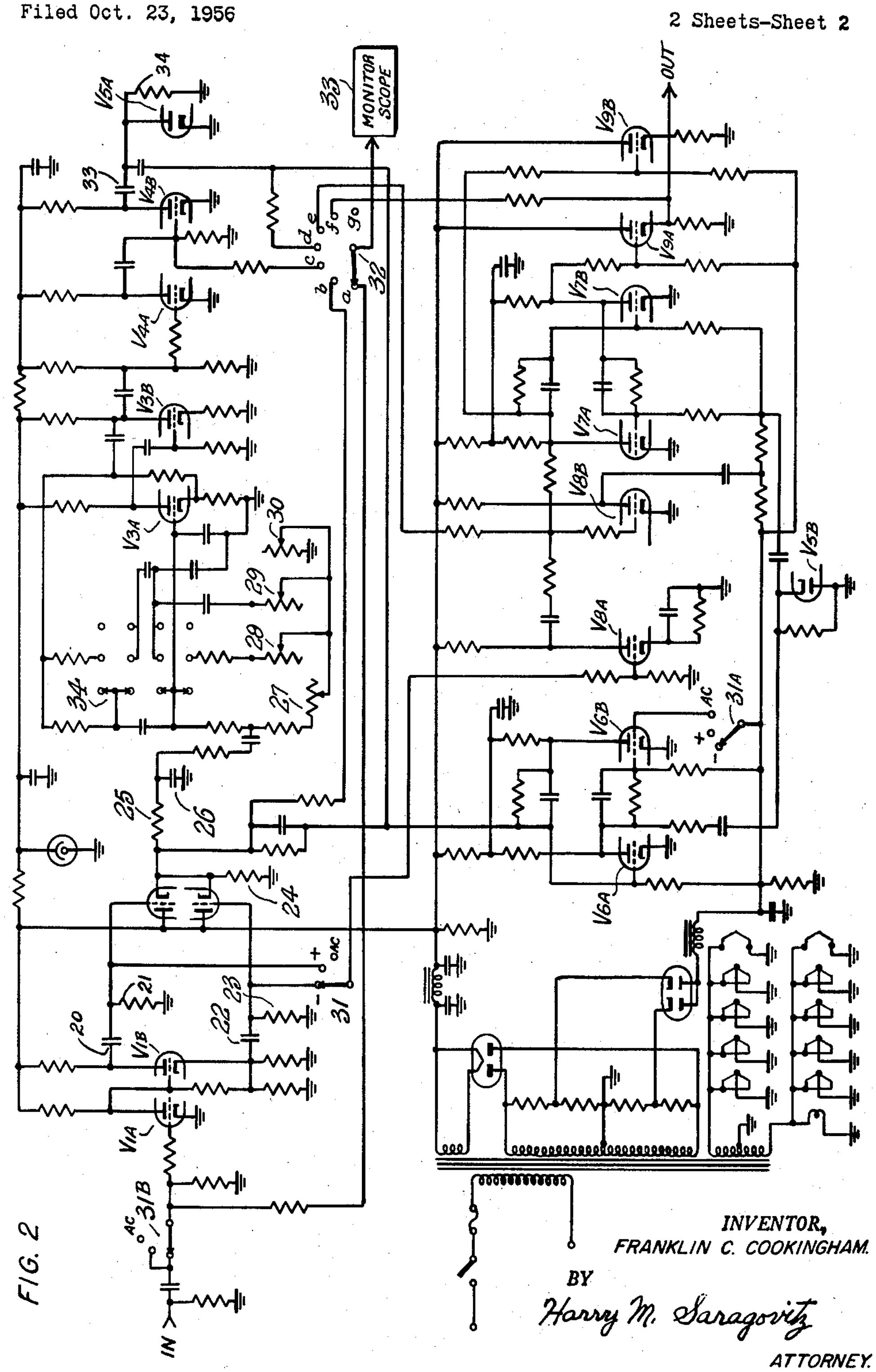
Figure 2 shows the schematic circuit diagram of a complete repeater circuit according to the invention.

Although the functions represented by the blocks in Figure 1 may be accomplished by means of several types of circuit adaptations, a preferred arrangement is shown in the complete circuit diagram of Figure 2.

Figure 3:
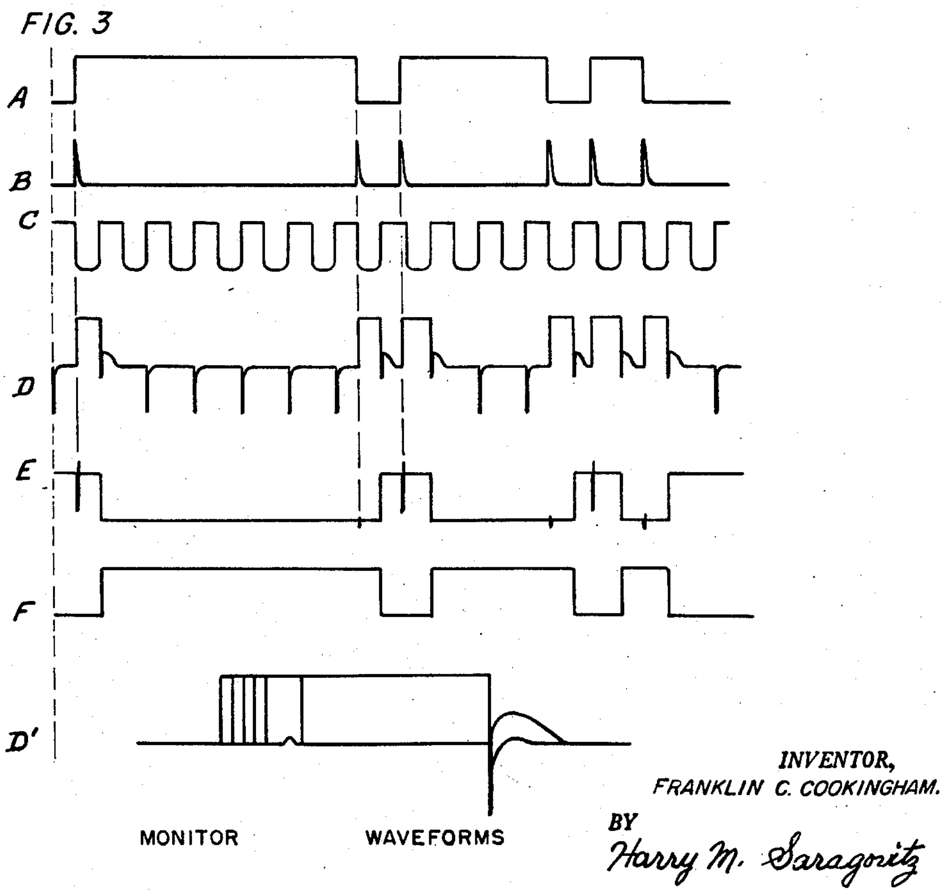
Figure 3 shows a series of graphs of wave forms to be referred to in connection with the description of the invention.

The signal to be regenerated is first passed thru a combination limiter and amplifier stage V1A, which removes any amplitude variations from the signal, and assures a rapid transition period with respect to the polarity changes of the signal. The signal is then fed to a paraphase amplifier V1B which provides two outputs, one normal and the other of reversed polarity, but of equal amplitude. These outputs are separately differentiated by identical networks 20, 21, 22, and 23 (0.5 millisecond time constants for the particular arrangement depicted). The two pulses are then fed to the grids of the pulse mixer for each polarity change of the incoming signal, regardless of the polarity change. When one of the mixer grids receives a positive pulse, the other grid receives a negative pulse. It will be noted that the pulse mixer comprises two cathode followers working into a common load resistor 24. Biasing of the mixers is such that there is no response to negative changes in the grid circuits. Thus only the positive pulses are passed thru the pulse mixer and develop a voltage across the load resistor 24. The next result of the circuit to this point has been to remove any undesirable D.C. component from the signal, and to establish a uniform polarity to the pulses which now represent the intelligence. These pulses, for a typical input signal, are shown by a graph B in Fig. 3 of the drawings. The top graph A represents a typical input signal including evidence of time distortion denoted by unequal spacing of the marking pulses. Graphs A and B are displayed on monitor scope 33, with switch 32 in position *a* and *b* respectively.

The output pulses across 24 are fed to a local oscillator V3A thru an integrating network 25 and 26, represented on the block diagram of Figure 1 by reference numeral 12, which minimizes the high frequency components of the pulses. The pulse nature of these pulses causes the local oscillator to be phase-controlled. The positive-going portion of the oscillator tending to lock in with the positive-going edge of the control pulses. The stability of the local oscillator (a Wien bridge type designed for maximum frequency stability) is such that frequency control is a secondary function of the control pulses. The local oscillator output wave is squared or top-limited by V4A and V4B which provide two stages of squaring amplification. The negative-going transition of the plate voltage of the second squaring amplifier is taken off as the output by means of a differentiating circuit 33 and 34, and a positive pulse clipping diode V5B. The phase relationship between the control pulse and the negative output pulses is established by design, and there is a nominal delay introduced. This delay varies with the number of channels of operation, and is 3.3 milliseconds, 4.5 milliseconds and 6.6 milliseconds for 4, 3, and 2 channel operation, respectively. As in all oscillators, it is rather difficult to maintain synchronization if the oscillator to be controlled is higher in frequency than the controlling source. For this reason a marginal difference in speed is established by adjusting the local oscillators free running frequency to approximately 149.5 c.p.s., 112 c.p.s., and 74½ c.p.s. for 4, 3, and 2 channels, respectively. This is a maintenance adjustment and should not be necessary for normal operation. A vernier control is usually provided on the front panel of the repeater to compensate for minor variation from the normal.

There are now two sets of pulses established in the repeater; a train of negative pulses being emitted from the local oscillator V3A, and the positive pulses from the mixer V2 which represent the incoming signal and its intelligence. Both sets of pulses are introduced to the grid of one section of an Eccles-Jordan trigger stage V6A and V6B through suitable decoupling networks. The action is as follows: the trigger stage has two states of equilibrium, and is such that only one triode is conducting at a particular time (disregarding the rapid change-over transition time). Controlling the stage from one grid requires that every other pulse be of opposite polarity. Thus a positive pulse causes the controlled section to conduct and to remain conducting until the arrival of a negative pulse. While the triode is conducting the plate voltage is lowered, and when the negative pulse causes the conduction to stop, the plate voltage rises suddenly. The train of negative pulses from the local oscillator V3A maintains the triode V6A in a non-conducting state until such time as a positive pulse comes in from the mixer V2. The triode V6A then conducts, lowering the plate voltage, and remains in this condition until the first negative pulse following the positive pulse cuts the triode section off again. This causes the plate voltage to rise suddenly, and this positive transisition, by differentiating and negative pulse clipping, is passed on to the second trigger stage V7A, V7B. Additional negative pulses have no effect since the triode is already cut off. The circuit will remain in this condition until another position pulse comes from the mixer V2 and causes a repetition of the above action. A typical waveform is shown by graph D, Figure 3, which appears on the monitor scope 33 when switch 32 is in position *d*. Graph D′ is similar to graph D but is displayed at the oscillator frequency rate: 150 c.p.s.; 112 c.p.s.; and 75 c.p.s. for 4, 3, and 2 channels respectively. This pattern is used for local oscillator adjustment. Channel adjustments are made by means of switch 34. Resistors 27, 28, 29, and 30 provide for fine frequency adjustment. The adjustment being proper when the upper and lower portions have a fixed phase relationship to one another. Optimum adjustment is obtained when the upper enclosed areas extend slightly to the left of the small positive pip on the base line as shown by graph D′. The outputs from second trigger stage 7A and 7B are coupled to the cathode followers V9A, V9B which are so biased as to have no output during those portions of the signal which are least positive on the trigger plates. Only one of these outputs is used, that of V9A—the other acts as a current balance for the power supply.

The net result of the first trigger V6A, V6B is that one locally generated pulse is substituted for each pulse present on the input signal. This pulse activates the D.C. restoring trigger stage V7A, V7B. Inasmuch as the output from the local oscillator V3A, V3B is uniform, the pulses thus formed have very little bias. Therefore, the pattern generated by the 2*d* trigger stage V7A, V7B has very little distortion, despite the fact that the incoming signal may have quite a high percentage of time distortion present. The repeater will tolerate approximately 40% pulse distortion upon the incoming signal, and will deliver a signal with less than 5% distortion. The output signal wave form is displayed on the monitor scope 33 when switch 32 is in position *f*.

It is necessary that the incoming and output signals in the repeater have a definite phase relationship to each other, and that the repeater be capable of automatically re-establishing the desired relationship, should it become disturbed by hits, bias, loss of signal, etc. This function is performed by the sense selector V8 and its associated circuit in the following manner: the pulses appearing at one of the grids of the pulse mixer stage V2, selected by switch 31, are passed to the grid of the sense selector V8. This triode is so biased as to have little response to negative, but passes the positive pulses. This produces a negative pulse on the plate which is mixed in a resistive network with a portion of the output from one section of the 2*d* trigger stage V7. The circuit proportions are such that, when the sampled pulse rests on the crest of the trigger waveform, there is no activity through the sense gate. Should the situation change, such as the trigger output become inverted (as might easily happen by sudden loss of signal and recovery), then the sample pulse would rest upon the lower portion of the waveform. The resultant sum of the voltages would be sufficiently negative to drive the sense gate V8A grid, which is normally saturated, negative. This would produce a positive pulse on the plate, which, passed to the control point of the trigger stage, would cause the trigger stage to reverse itself, thereby re-establishing the desired phase relation. A typical waveform appearing at the sense take-off point is shown by graph E which is displayed on the monitor when switch 32 is in position *e*.

Switch 31 of Figure 2, in addition to having the positions indicated by switch 12 in Figure 1, had a third position marked "AC" position the repeater generates a square wave related to the setting of the channel switch 34 which closely parallels the dot-cycle rate of the corresponding multiplex signal of the same number of channels operation. The dot-cycle rates these square waves for different positions of the channel switch 34 are approximately 37½, 56¼, and 74½ c.p.s. for 2, 3, and 4 channels respectively. In this position of switch 31 the first trigger stage is disabled to eliminate the need for positive pulses. In this condition the triode of the trigger stage, which is controlled, is normally saturated, and is periodically cut off by the drive pulses from the local oscillator. At the same time the input circuit is disabled, so as to permit the local oscillator to operate in a free-running state. The square wave thus generated by the 2*d* trigger stage corresponds very closely to that produced by the associated multiplex terminal equipment. The generated pulses are very useful for such purposes as bias checks, etc., upon associated equipments.

While there has been described what is at present considered to be the preferred embodiment of this invention, it will be obvious to those skilled in the art that various changes and modifications may be made therein without departing from the invention, and it is therefore, aimed in the appended claims to cover all such changes and modifications as fall within the true spirit and scope of the invention.

What is claimed is:

1. A regenerative repeater for multiplex telegraph signals comprising means for producing uni-direction pulses representative of said telegraph signals; an oscillator the frequency of which is substantially equal to the dot-cycle rate of said telegraph signals, means for feeding a portion of the output of said means for producing to said oscillator; a first trigger circuit, means connecting the output of said means for producing to the input of said first trigger circuit, means for connecting the output of said oscillator to the input of said first trigger circuit; and a second trigger circuit responsive to the output of said first trigger circuit for producing a regenerated signal.

2. In a regenerative repeater according to claim 1 means for controlling the phase between the input telegraph signal and the regenerated signal comprising: means responsive to the polarity of the input signal pulse; a control signal mixing means connected between said means responsive to said polarity and the output of said second trigger circuit means; a gate circuit connected between the output of said signal mixing means and the input of said second trigger circuit.

3. A regenerative repeater for multiplex telegraph signals comprising an input circuit including a phase inversion circuit for signals to be regenerated; a positive pulse mixer circuit means for converting the output of said phase inversion circuit into unidirectional signal pulses representative of said telegraph signals; an oscillator circuit the frequency of which is substantially equal to the dot-cycle rate of the signal to be regenerated; a first trigger means; means connecting said oscillator circuit between the output of said means for converting said first trigger means; a second trigger circuit means responsive to the output of said first trigger, said second trigger circuit means including an output means for the regenerated signal.

4. A regenerative repeater for telegraph signals comprising: a phase inverter circuit responsive to said telegraph signals for converting said signals into two oppositely-directed pulse signals, a pulse mixer means responsive to said pulse signals for producing unit-directional pulses representative of said telegraph signals; an oscillator responsive to a portion of the output of said pulse mixer, a first trigger means responsive to the output of said pulse mixer and of said oscillator; a second trigger circuit means for producing regenerated signals in accordance with the output pulses from said first trigger circuit; and control means connected between the output of said second trigger means and said phase inverter for maintaining the phase relationship between the telegraph signals and the regenerated signal.

5. A regenerative repeater for telegraph signals comprising: an input circuit means for converting said telegraph signals into a pair of oppositely-directed signal pulses, means for converting said signal pulses into a series of positive-going pulses representative of said telegraph signal; an oscillator, means for feeding a portion of the output of said means for converting to said oscillator for producing negative-going pulses; a first trigger circuit means responsive to the combination of said positive-going and said negative-going pulses; a second trigger circuit means responsive to the output of said trigger for producing the regenerated signal.

References Cited in the file of this patent

UNITED STATES PATENTS

| | | |
|---|---|---|
| 1,836,574 | Burton | Dec. 15, 1931 |
| 2,039,629 | Burton | May 5, 1936 |
| 2,359,649 | Kahn et al. | Oct. 3, 1944 |
| 2,705,261 | Canfora et al. | Mar. 29, 1955 |
| 2,744,957 | Carver | May 8, 1956 |